United States Patent [19]

Yamomoto et al.

[11] Patent Number: 4,874,233
[45] Date of Patent: Oct. 17, 1989

[54] DIAPHRAGM CONTROL DEVICE FOR INTERCHANGEABLE LENS

[75] Inventors: Hiroshi Yamomoto, Kanagawa; Shigeru Yoshida; Katumi Yoshida, both of Saitama, all of Japan

[73] Assignees: Canon Kabushiki Kaisha; Canon Denshi Kabushiki Kaisha, both of Tokyo, Japan

[21] Appl. No.: 35,453

[22] Filed: Apr. 7, 1987

[30] Foreign Application Priority Data

| Apr. 14, 1986 | [JP] | Japan | 61-055846[U] |
| Apr. 14, 1986 | [JP] | Japan | 61-085516 |
| Jul. 16, 1986 | [JP] | Japan | 61-167494 |
| Jul. 17, 1986 | [JP] | Japan | 61-168913 |
| Jul. 17, 1986 | [JP] | Japan | 61-168914 |
| Jul. 18, 1986 | [JP] | Japan | 61-169431 |

[51] Int. Cl.[4] .................... G02B 15/00; G02B 7/14
[52] U.S. Cl. .................... 350/429; 350/255; 354/446
[58] Field of Search ......... 350/429, 255; 354/274, 354/286, 195.11, 400, 435, 439, 445, 446, 452

[56] References Cited

U.S. PATENT DOCUMENTS

| 3,687,042 | 8/1972 | Mizui et al. |  |
| 4,113,359 | 9/1978 | Koike et al. | 354/274 |
| 4,322,145 | 3/1982 | Yamada et al. | 354/435 |
| 4,460,253 | 7/1984 | Kawai et al. | 354/446 |
| 4,472,039 | 9/1984 | Iwata et al. |  |
| 4,605,286 | 8/1986 | Sumi | 350/429 |
| 4,695,145 | 9/1987 | Kawamoto |  |

FOREIGN PATENT DOCUMENTS

57-165825 10/1982 Japan .

Primary Examiner—Bruce Y. Arnold
Assistant Examiner—Loha Ben
Attorney, Agent, or Firm—Fitzpatrick, Cella, Harper & Scinto

[57] ABSTRACT

A diaphragm control device for use in an interchangeable lens of a single lens reflex camera. A motor for driving diaphragm blades includes a coil, a rotor, and a stator which are arranged in a diaphragm device comprising a ring-shaped disc with diaphragm blades that open and close an optical path hole provided in a central portion thereof. The rotor and stator are disposed on the surface of a ring-shaped disc between the periphery of the opening and the outer periphery of the diaphragm device. The shaft of the rotor, the coil, and the stator are positioned in parallel with the axis of the opening, and the rotor and the coil are arranged in a parallel arcuate row on the surface of the ring-shaped disc. The present invention provides a diaphragm device which, when installed in the lens barrel, has reduced size and makes it possible to drive the diaphragm blades with high torque.

18 Claims, 5 Drawing Sheets

DIAPHRAGM CONTROL DEVICE FOR INTERCHANGEABLE LENS

BACKGROUND OF THE INVENTION

1. Field of the Invention

This invention relates to diaphragm devices, and more particularly to a lens barrel diaphragm device of the type in which a diaphragm mechanism arranged in the interchangeable lens is driven by a stepping motor.

2. Description of the Prior Art

The 35 mm cameras of the non-interchangeable lens type are generally called compact cameras. In a camera of this type, as the exposure device, there is installed a lens shutter device which also serves as a diaphragm. The lens shutter device installed in the recently developed compact camera employs a direct type electromagnetic drive structure. In such a lens shutter device, the sector ring which bears the shutter blades (or diaphragm blades) functions itself as the rotor of the electromagnetic drive device (that is, motor). Also, though not put into practice, another type of lens shutter device in which the sector ring is rotated by a stepping motor of cylindrical shape (or ring shape) having a ring-shaped rotor of as large a diameter as the lens barrel is proposed. (See, for example, Japanese Laid-Open patent application No. Sho 58-17428).

In these prior known lens shutter devices, because the sector ring which bears the diaphragm blades (sectors) is driven by the motor directly connected thereto, there is no need to use a mechanism of complicated structure for rotating the sector ring to an arbitrary angle and setting a location. Therefore, they are small in size and light in weight, and are suited to electronic control.

Meanwhile, in the single lens reflex camera whose lens has a far larger diameter than in the lens shutter camera, and is interchangeable (hereinafter referred to as the "reflex camera"), there is employed such a layout that, within the camera body, a focal plane shutter is installed, while, within the lens barrel (or interchangeable lens), a diaphragm device is mounted. This diaphragm device is arranged so as to be mechanically driven from a diaphragm drive device provided in the camera body through a linkage lever. In the conventional reflex camera of such structure, not only is the mechanical structure of the diaphragm drive device in the camera body complicated, but also other mechanisms in the camera body which relate to the diaphragm drive device including the linkage lever, too become complicated. Therefore, there is a drawback in that the weight of the entire camera including the lens barrel is heavy and the volume of the entire camera is large. Also, since the transmitting of the driving force to the diaphragm device is performed through a complicated mechanical power transmission intermediary, the responsibility of the control operation is bad, and it is not suited to electronic control.

For this reason, in the conventional reflex camera, by improving the diaphragm device, the weight of the whole of the camera can be reduced. Thus, it is required to realize a diaphragm device of good control response characteristics.

In order to realize a diaphragm device which enables the weight and volume of the camera body and interchangeable lens to be reduced, and the control response characteristics to be improved, it is desirable that the diaphragm device of the reflex camera is also constructed as a direct motor driven type diaphragm device.

However, in the past, the electromagnetic drive device for the lens shutter mounted in the compact camera as has been described before, had its sector ring (or a rotary plate of the same size as the sector ring) of the diaphragm blades itself constitute the rotor, and, in the lens shutter device disclosed in the above-cited document, a ring of large diameter constituted the rotor. Therefore, the inertia of the rotor itself is very large. As is known in the art, letting the diameter of the rotating body be denoted by D and the gravity acceleration by G, the inertial mass of the rotating body is proportional to $GD^2$. Hence, in the above-described electromagnetic drive device whose rotor is a ring-like body of a large value in D, the inertial mass of the rotor is very large. Therefore, there were drawbacks that the starting characteristics and the control response characteristics were poor also, since the coil for the stator was formed on a ring with its center at the optical axis, and because the number of turns of the coil could not be increased, a high ampere turn could not be obtained, and, therefore, a small starting torque could only be obtained. Therefore, although it was usable as the diaphragm drive motor for the lens of small diameter as in the compact camera, it was impossible to employ the structure of that electromagnetic drive device as the motor for the diaphragm device of large diameter in the reflex camera. That is, if a motor for the diaphragm device of large diameter is designed to have the same structure as that of the above-described electromagnetic drive device, the magnetomotive force cannot be increased at as high a rate as the inertial mass of the rotor increases. As a result, starting the driving of the rotor becomes difficult, and it will easily fall out of control. So, it will frequently occur that the rotor, while fluctuating in the stop position, does not rotate.

SUMMARY OF THE INVENTION

One aspect of the invention is to provide a lens mounting having a diaphragm device based on a motor drive suited to drive the diaphragm device within the above-described interchangeable lens.

Another aspect of the invention is to provide a lens mounting in which there are arranged a diaphragm device having a plurality of diaphragm blades for opening and closing an exposure aperture, and a motor in a space between the outer diameter of the diaphragm device and the maximum diameter of the aperture, the motor having a rotor whose rotary shaft is almost parallel with the optical axis, and stator pole teeth surrounding the rotor, so that the diaphragm device is driven by rotation of the rotor shaft of the motor.

Still another aspect of the invention is to provide a lens mounting in which a rotary member of ring-like disc shape has a plurality of diaphragm blades and is arranged, upon rotation, to open and close an exposure aperture. A motor is arranged in a position outside the exposure aperture and comprises a rotor whose central axis line is extended in parallel to the central axis line of the aperture, stator coils and stator pole teeth. The rotor and each of the coils being arranged in parallel with each other, and rotation of the shaft of the rotor being transmitted to a gear of large diameter provided in the periphery of the rotary member so that the aperture is opened or closed by the rotation of the rotor.

Other objects of this invention will become apparent from the following description of an embodiment thereof be reference to the drawings.

BRIEF DESCRIPTION OF THE DRAWINGS

FIG. 4(a) to 4(d) are plan views of the electromagnetic drive means in the device of the invention.

DESCRIPTION OF THE PREFERRED EMBODIMENT

Figure 1:
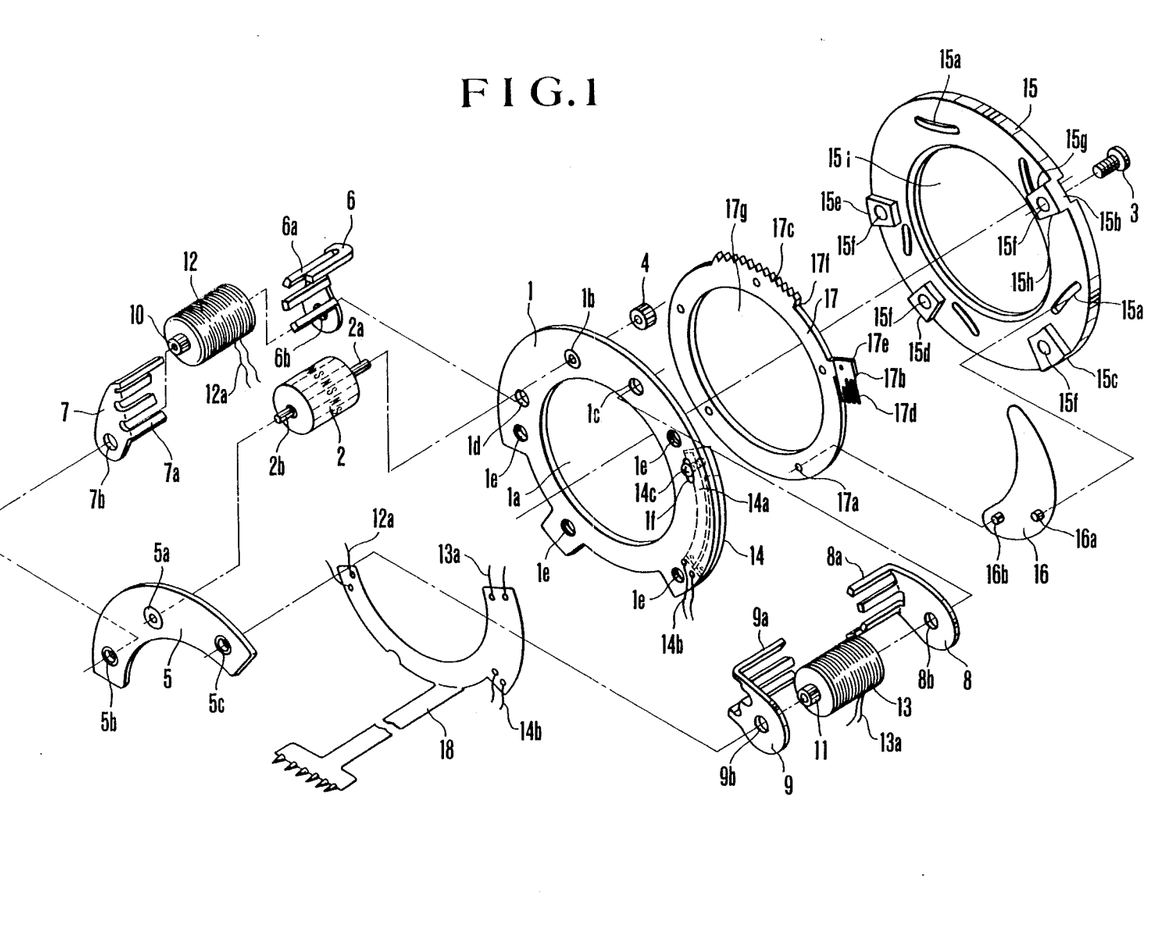
FIG. 1 is an exploded perspective view of a lens mounting with a diaphragm device according to the invention.

An embodiment of the invention is next described with reference to the drawings. FIG. 1 is an exploded perspective view of the main parts of the motor driven type exposure device.

The motor driven type exposure device of this embodiment shown in the exploded state in FIG. 1 is constructed with a motor (in this embodiment, 2-phase stepping motor) for driving diaphragm blades or light-shield blades to be described later. The motor comprises a rotor 2, stators 6–9, and coils 12 and 13 for magnetizing the stators. A first support member 1 of ring-like disc shape supports the rotor, stators and coils at their one ends, this member also serving as a side wall of the motor. A cam plate 15 (or second support member) is fixedly secured to the first support member 1. A rotary ring 17 is rotatably supported on the cam plate 15 and arranged to be driven by the rotor 2. Five diaphragm blades 16 are pivotally mounted on the rotary ring 17 and their movement is controlled by the cam plate 15. An electrically conductive pattern plate 14 is fixedly mounted on one surface of the support member 1, and a flexible printed board 18 is electrically connected to the electrically conductive pattern plate 14 and also electrically connected to the coils 12 and 13. A bearing plate 5 supports the other ends of the rotor 2, stators 6–9 and coils 12 and 13.

The support member 1, cam plate 15 and rotary ring 17 have respective apertures 1a, 15i and 17g with inner diameters corresponding to the diameter of the photographic lens.

The support member 1 has a bearing 1b for rotatably supporting one end 2a of a shaft of the rotor 2 in a position outside the exposure aperture 1a. Also, the support member 1 is provided with a hole 1d into which an iron core 10 of the coil 12 is inserted in fixedly secured relation. Support member 1 has another hole 1c into which an iron core 11 of the coil 13 is inserted in fixedly secured relation. Support member 1 also has screw-threaded holes 1e into which bolts 3 are screwed past the holes 15f of the cam disc 15. Support member 1 also has long slot 1f at which the electrically conductive pattern plate 14 is fixedly secured to the support member 1 in an adjusted position. The support member 1 is made of a material of such a property as not to resonate with the rotor 2 and the stators, and is configured to be fixedly mounted in the barrel of the interchangeable lens. Meanwhile, the arcuate bearing plate 5 which is positioned to confront one side surface of the support member 1 after a prescribed interval, is provided, besides the bearing 5a for rotatably supporting the other end 2b of the shaft of the rotor 2, with a hole 5b into which the iron core 10 of the coil 12 is inserted in fixedly secured relation, and another hole 5c into which the iron core 11 of the coil 13 is inserted in fixedly secured relation.

It is in a position between the support member 1 and the bearing plate 5 that the rotor 2, the stators 6–9 and the coils 12 and 13 are arranged in a space outside the exposure aperture 1a (in other words, an outer space of a virtual cylinder with its cross-section identical to the exposure aperture 17g of the rotary ring 17) at a curved line along the periphery of the exposure aperture 1a. And, only the rotor 2 is rotatably supported by the bearings 1b and 5a, while the other members (namely, the stators 6–9 and the iron cores 10 and 11 of the coils 12 and 13) are supported by the support member 1 and the bearing plate 5 so that they cannot rotate or be and axially moved.

The stators 6–9 have a plurality of teeth 6a–9a lying side by side in a circle along the outer periphery of the rotor 2, and have holes 6b–9b fitted on the iron cores 10 and 11. The stators 6 and 7 are first mounted at the respective holes 6b and 7b to the iron core 10 of the coil 12, and then supported in the stationary state along with the iron core 10 on the support member 1 and the bearing plate 5. Also, the stators 8 and 9 are first mounted at the respective holes 8b and 9b to the iron core 11 of the coil 13 and then supported in the stationary state on the support member 1 and the bearing plate 5.

The rotor 2 is a cylinder constructed with a permanent magnet. In its outer periphery the N pole pieces and the S pole pieces are arrayed alternatively in the circumferential direction parallel with the axial line. The peripheral length of each N pole piece and each S pole piece is almost equal to the peripheral length of the teeth 6a–9a of the stators 6–9. In this embodiment, the numbers of the N poles and the S poles of the peripheral surface of the rotor 2 are 11 each. That is, the outer periphery of the rotor 2 is constructed with 11 N pole pieces and 11 S pole pieces alternating with each other.

Figure 4A:
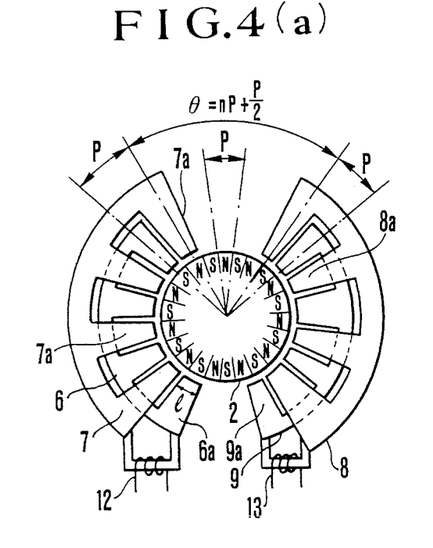

The teeth 6a of the stator 6 and the teeth 7a of the stator 7 are alternatively arranged along the outer periphery of the rotor 2 as shown in FIG. 4(a). Also, the teeth 8a of the stator 8 and the teeth 9a of the stator 9 are alternately arranged likewise along the outer periphery of the rotor 2. The width, l, of the surface of the inside of the teeth of each stator (the circumferential length, l, in the surface confronting the outer periphery of the rotor 2) is almost equal to the peripheral length of each pole piece of the rotor 2. Therefore, the teeth of the stator and the magnet pieces of the rotor 2 can just oppose each other. However, in this embodiment, as shown in FIG. 4(a), the teeth 6a and 7a of the stators 6 and 7 are arranged so as to adjust oppose each pole piece of the rotor 2, but the teeth 8a and 9a of the stators 8 and 9 are arranged in the intermediate positions between the N pole pieces and the S pole pieces.

The shaft 2a of one end of the rotor 2 penetrates through the bearing 1b provided in the support member 1 and projects out of the other end surface of the support member 1. A pinion 4 is mounted on that projected portion. This pinion 4 meshes with teeth 17c of the outer periphery of the rotary ring 17 to be described later to transmit rotation of the rotor 2 to the rotary ring 17.

A flexible printed board 18 to which current supply lead wires 12a of the coil 12, current supply lead wires 13a of the coil 13, and current supply lead wires 14b of the electrically conductive pattern plate 14, are to be connected, is mounted to a lower portion of the left hand side surface of the support member 1 (the side surface on which the rotor 2 and others are arranged) by a screw fastener or an adhesive agent. Meanwhile, the electrically conductive pattern plate 14 having an electrically conductive pattern 14a is fixedly secured to the right hand side surface of the support member 1 by a screw fastener 14c, and the screw fastener 14c is inserted into the slot 1f of circumferential direction penetrated through the support member 1 so as to alter the fixed position of the electrically conductive pattern plate 14. The electrically conductive pattern plate 14 is electrically connected to the flexible printed board 18 by the current supply lead wires 14b, and is connected to a control circuit through the flexible printed board 18.

The cam plate 15, to be fixedly secured to the support member 1, is provided with four flat projected portions 15b–15e in correspondence to the screw-threaded holes 1e of the support member 1. In the projected portions 15b–15e there are provided holes 15f of oval shape through which the bolts 3 can be inserted. The holes 15f are elongated in the circumferential direction. Therefore, when the cam plate 15 is to be fixed to the support member 1 by inserting the bolts 3 through the holes 15f and screwing them into the screw-threaded holes 1e, the fixed position of the cam plate 15 relative to the support member 1 can be altered by slightly rotating the cam plate 15 in the circumferential direction.

The projected portions 15b–15e of the cam plate 15 are constructed as spacers for forming a gap between the support member 1 and the cam plate 15, and the inner peripheral surfaces of the projected portions 15b–15e are constructed as a supporting surface for the rotary ring 17 so that the outer periphery of the rotary ring 17 is rotatably supported by the inner peripheral surfaces of the projected portions 15b–15e.

Five holes 17a are formed in the rotary ring 17. Pins 16b are projectingly provided on the diaphragm blades 16. (Though only one blade is shown in FIG. 1, there are five diaphragm blades). The pins 16b are rotatably (impossible to move in the axial direction) fitted in the holes 17a respectively. That is, the five diaphragm blades 16 are pivotally mounted on the rotary ring 17. The movement of each diaphragm blade 16 is controlled by a camming slot 15a formed in the cam plate 15. A pin 16a projectingly provided on each diaphragm blade 16 is inserted into the camming slot 15a so as to be slidable relative to each other.

Teeth 17c, constituting a driven gear for speed reduction in mesh with the pinion 4, are provided in the outer periphery of the rotary ring 17, and a projected portion 17b is also provided. A contact piece 17d to slide on the electrically conductive pattern 14a of the plate 14 is mounted on the projected portion 17b. The electrically conductive pattern 14a and the contact piece 17d constitute an on-off type detecting means for electrically detecting whether the diaphragm is in the fully open state or in the closed down state. In the case of this embodiment, the detecting means is arranged so that when the contact piece 17d contacts with the electrically conductive pattern 14a, the diaphragm is in the closed down state, and when the contact piece 17d and the electrically conductive pattern 14a do not contact with each other, the diaphragm is in the full open aperture state. The detecting means has the purpose of discriminating whether or not the diaphragm is at the full open aperture, constituting a safety system that makes it possible to prohibit a light metering (that is, an exposure), for example, when the diaphragm blades are accidentally moved to smaller apertures by a shock from the outside.

When the support member 1, the cam plate 15, and the rotary ring 17 are assembled, the projected portion 15b of the cam plate 15 is located at a position between the projected portion 17b the teeth 17c of the rotary ring 17. Therefore, as the rotary ring 17 has rotated in a clockwise direction as viewed in FIG. 1, when one end portion 17f of the teeth 17c abuts on one side surface 15g of the projected portion 15b, the clockwise rotation of the rotary ring 17 is hindered. As the rotary ring 17 is rotated in the counter-clockwise direction, when one side surface of the projected portion 17b abuts on the other side surface 15h of the projected portion 15b, the counter-clockwise rotation of the rotary ring 17 is hindered. That is, the projected portion 15b of the cam plate 15, the projected portion 17b of the rotary ring 17, and one end portion 17f of the teeth 17c are constructed as a stopper for limiting the rotation of the rotary ring 17 to a certain range of angles of rotation.

Figure 2:
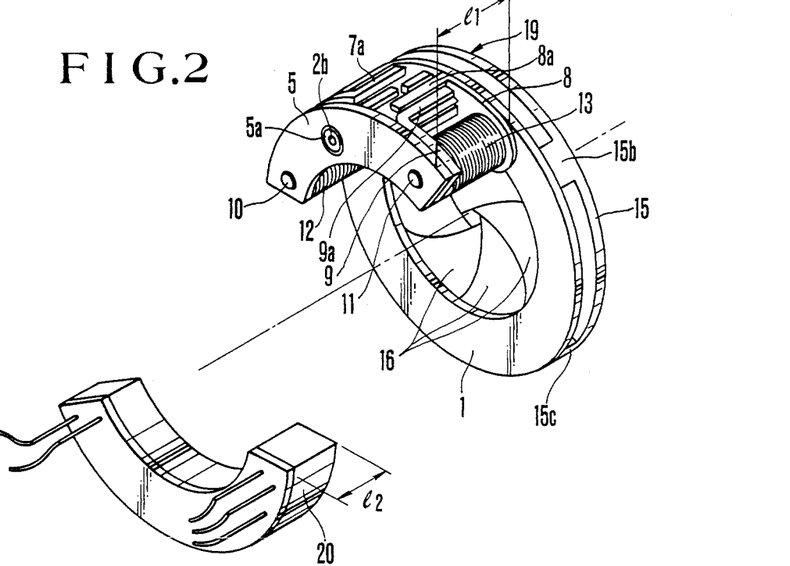
FIG. 2 is a perspective view of an embodiment of the device of FIG. 1 in the assembled state.

FIG. 2 is a perspective view of an electromagnetic diaphragm unit 19 obtained by assembling the support member 1, the rotor 1, the stators 6–9, the coils 12 and 13, the electrically conductive pattern plate 14, the cam plate 15, the diaphragm blades 16, the rotary ring 17 and others as a unit. Though the flexible printed board 18 is not depicted, an arcuate portion of the flexible printed board 18 is mounted to the side surface of the support member 1, and connection terminals of the front end of its band-like portion are to be connected to a casing 20 of an electronic control device stationary relative to the unit 19. The casing 20 contains a control IC (intergrated circuit) which performs control and provides current supply to the coils 12 and 13 of the unit 19, and gives and takes signals to and from a control IC within the camera body. The casing 20 is mounted to a stationary portion of the lens mounting. In this case, since the casing 20 is mounted on the stationary portion in the lens mounting so as to be positioned in a lower space of the motor comprised of the rotor 2, the stators 6–9 and the coils 12 and 13, or the electromagnetic drive means, the lower space of the electromagnetic drive means is effectively utilized. That is, in case the unit 19 is incorporated as a unit with a movable lens frame in the zoom lens mounting, because the electromagnetic drive means is projecting, the space beneath the electromagnetic drive means is left not effectively utilized in the stroke end of movement. But, by installing the casing 20 of semi-circular shape as shown in FIG. 2 containing the control IC and other elements mounting into that space, it becomes possible to effectively utilize that space.

Figure 7:
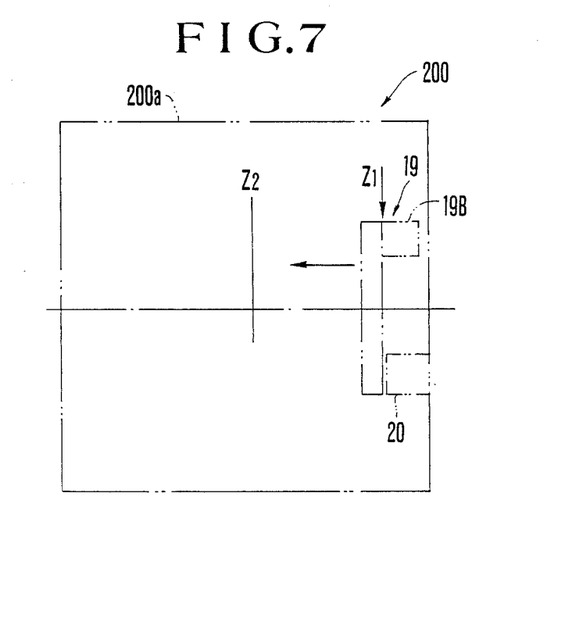
FIG. 7 is a schematic side elevational view explaining the location of the diaphragm device of the invention within the lens mounting.

In more detail, as shown in FIG. 7, the casing 20 is fixedly mounted within a barrel 200a relative to the unit 19 in the interior of the interchangeable lens 200. The unit 19 moves from a first stroke end position $Z_1$ to a second stroke position $Z_2$ along an optical axis within the barrel 200a by a zoom mechanism. Because the motor 19B projects only from a portion of the side surface of the unit 19, when the unit 19 stops in the first stroke end position $Z_1$, the space in which the motor 19B is not present between the inner end surface of the barrel 200a and the side surface of the unit 19 is left as a dead space. Therefore the utilization of the space within the barrel is low, causing an increase in the size of the volume of the barrel.

Therefore, by providing a casing 20 which is capable of approaching the side surface of the body of the unit 19 at a space where the motor 19B is not present within the barrel 200a in the first stroke end position of the unit 19, an effective utilization of that dead space can be achieved.

Also, as the casing 20 is mounted to that side surface of the unit 19 which is in the position where that motor is not present, if the axial length, $l_1$, of the motor and the axial length $l_2$, of the casing 20 are made to satisfy $l_1 \geq l_2$, the side surface of the whole of the unit including the motor 19B and the casing 20 becomes almost flat. Even in this case, when a unit is incorporated into the zoom lens mounting, there is no possibility that the space in which the motor 19B is not present in the stroke end of the zooming operation becomes a dead space.

Note that, in the embodiment of FIG. 2, there has been shown a case where the control IC for the control of the electromagnetic drive means is accommodated in the casing 20. But, instead of the casing 20, another motor for auto-focus and electrical parts such as a filter or a full open aperture insuring switch may be arranged in the place the casing 20 is to occupy.

Figure 3:
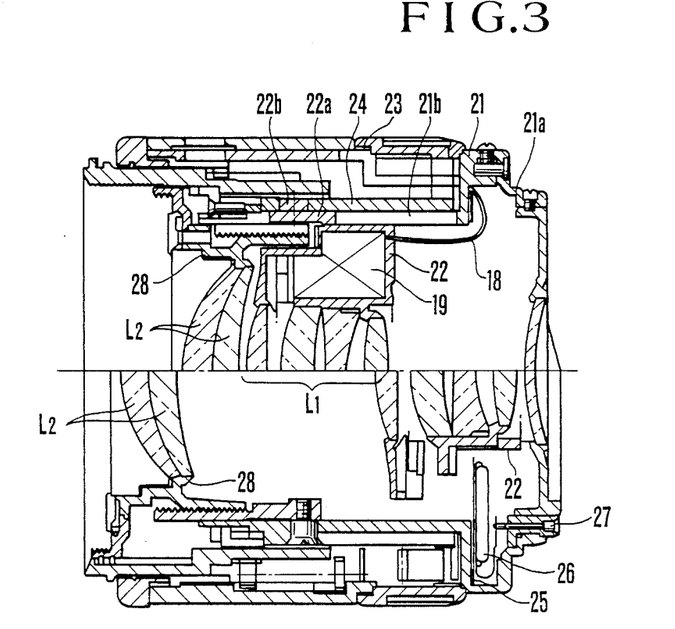
FIG. 3 is a schematic longitudinal section view of a zoom lens mounting constructed with the device of FIG. 2.

FIG. 3 is a longitudinal section view of a zoom lens mounting (that is, interchangeable lens) constructed with the assembly of the electromagnetic diaphragm unit shown in FIG. 2. In FIG. 3, the upper half is a longitudinal section view illustrating the state of the unit at a non-zooming time, and the lower half is a longitudinal section view illustrating the state of the unit at a zooming time.

In FIG. 3, a fixed tube 21 constitutes a body of the lens mounting. A mount 21a to be attached to a mount of the camera body is formed in the rear end portion of the fixed tube 21. An axial slot 21b is formed in the fixed tube 21. A key 22a of a movable sleeve 22 is slidably fitted in the axial slot 21b. The electromagnetic diaphragm unit 19 of FIG. 2 is mounted to the movable sleeve 22. Of the photographic lens, a rear lens unit $L_1$ is carried on the movable sleeve 22.

A zoom operating ring 23 is rotatably fitted relative to the fixed tube 21. A rotatable cam sleeve 24 which is rotated by this zoom operating ring 23 is fitted in the fixed tube 21. A follower 22b of the movable sleeve 22 is inserted into a camming slot (not shown) of the rotatable cam sleeve 24.

The flexible printed board 18 for supplying current and transmitting control signals to the coils 12 and 13 (see FIG. 1) in the electromagnetic diaphragm unit 19 is connected to an IC fabrication substrate 25 in the fixed tube 21. A control IC 26 for controlling the current supply to the coils 12 and 13 is mounted to the substrate 25. The control IC 26 and the IC fabrication substrate 25 may be accommodated, for example, in the casing 20 of FIG. 2, and the casing 20 may be fixed in the fixed tube 21 as shown in the figure.

Connection terminals 27 are provided on the end surface of the mount 21a, through which the electrical power source and the control circuit in the camera body are to be connected to the IC fixed to the IC fabrication substrate 25, and are arranged to contact with connection terminals provided in the mount of the camera body.

Note that, $L_2$ is a front lens unit, and 28 is a frame holding the front lens unit $L_2$.

FIGS. 4(a)-4(d) are diagrams for explaining the mutual positional relationship of the rotor 2 with the stators 6-9 and the operation of indexing the rotation of the rotor 2.

Figure 4B:
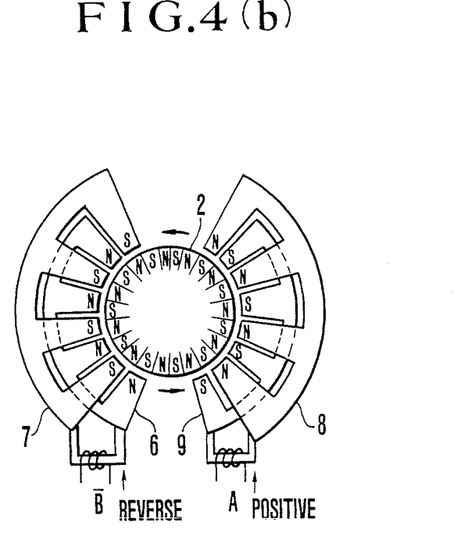
Figure 4C:
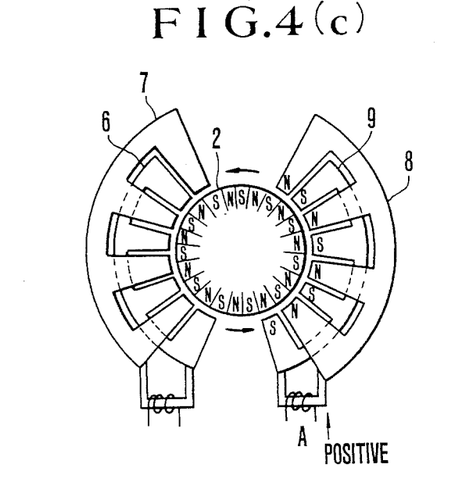
Figure 4D:
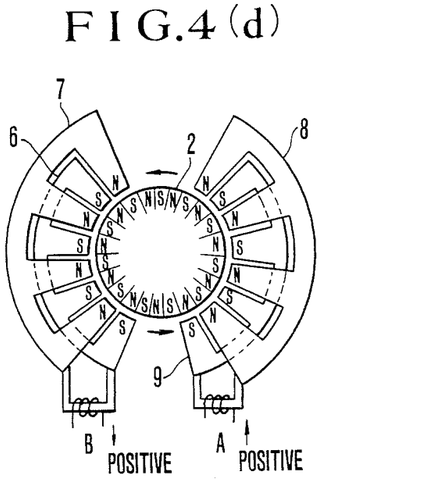
Figure 5:
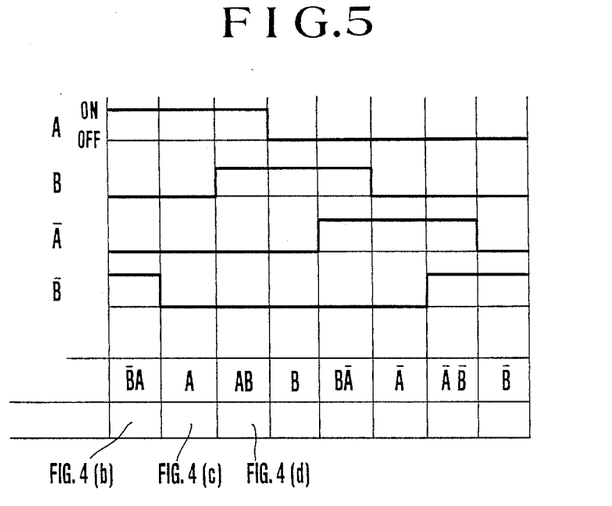
FIG. 5 is a diagram for explaining the operation of the electromagnetic drive means of FIG. 4.

Also, FIG. 5 is a graph which explains the excited states of the stators 6-9 corresponding to FIGS. 4(a)-4(d).

FIG. 4(a) illustrates the relative position of the rotor 2 to the stators 6-9 when the coils 12 and 13 are not supplied with current. At this time, the rotor 2 stands still under a condition that the S pole pieces of the rotor 2 are right opposed to the respective teeth 6a of the stator 6, and the N pole pieces of the rotor 2 are right opposed to the respective teeth 7a of the stator 7. Meanwhile, at this time, the teeth 8a and 9a of the stator 8 and the stator 9 each right oppose one half of each of the respective adjacent two of the S and N pole pieces of the rotor 2. In this case, the angle $\theta$ between the most terminal tooth of the stator 7 and the nearest tooth of the stator 8 thereto is expressed by $\theta = np + p/2$ where n is a positive integer, and p is the pitch between the adjacent teeth of the stators 6 and 7, and also the pitch between the adjacent teeth of the stators 8 and 9.

In order for the rotor 2 that has been stopped in the state of FIG. 4(a) to begin to rotate in prescribed angles in a prescribed direction, the time of current supply (or the number of control pulses) and the direction of current flow to the coils 12 and 13 are controlled in such a manner as, for example, shown in FIG. 5.

FIG. 5 illustrates the direction of current flow to the coils 12 and 13 and the time of current supply thereto, where the abscissa represents the time of current supply (or the number of pulses) and the ordinate represents the on-off states. Also, A denotes the positive direction of current flow to the coil 13 as shown in FIGS. 4(b)-4(d), $\overline{A}$ denotes the reverse direction of current flow to the coil 13, B denotes the positive direction of current flow to the coil 12, and $\overline{B}$ denotes the reverse direction of current flow to the coil 13.

A method for controlling the rotation of the rotor 2 is described below with reference to FIGS. 4(b) to 4(d) and FIG. 5.

When the coil 13 is supplied with A current, and the coil 12 with $\overline{B}$ current as shown in FIG. 4(b) and FIG. 5, the teeth 6a of the stator 6 are magnetized to N, the teeth 7a of the stator 7 to S, the teeth 8a of the stator 8 to N, and the teeth 9a of the stator 9 to S. For this reason, the individual teeth of all the stators 6-9 attract or repel the magnetic pole pieces in the outer peripheral surface of the rotor 2 so that the rotor 2 rotates in the counter-clockwise direction by p/4. When it has rotated in p/4, the force the stators 6 and 7 exert on the rotor 2 and the force the stators 8 and 9 exert on the rotor 2 become equal in magnitude and opposite in direction to each other, the rotor 2 stops. If, at this time, as shown in FIG. 5, the supply of $\overline{B}$ current to the coil 12 only is cut off, the stators 6 and 7 are de-magnetized, and, as shown in FIG. 4(c), the excited state of the stators 8 and 9 alone is continued. For this reason, the rotor 2 that has been stopped in the position where it is shifted p/4 from each of the teeth of the stators 6 and 7, rotates in the counter-clockwise direction until the N pole pieces of the rotor 2 are right opposed to the teeth 9a (magnetized to S) of the stator 9, and then stops again. And, in this event too, the angle of rotation of the rotor 2 is p/4.

Next, when the coils 12 and 13 are supplied with B and A currents respectively, the teeth 6a of the stator 6 are excited to S, as shown in FIG. 4(d), and the teeth 7a of the stator 7 to N, while the teeth 8a of the stator 8 are excited to N and the teeth 9a of the stator 9 to S. By the same principle as that described above, therefore, the rotor 2 rotates p/4 in the counter-clockwise direction, and then stops.

The other combinations of the directions of current flow to the coils 12 and 13 than those described above, are B+0, B+A̅, 0+A̅, A̅+B̅ and 0+B̅. The total sum of the combinations is 8 in number. In the device of this embodiment, each of the eight combinations is formed by one pulse. By using pulsated control of the current supplied to the coils 12 and 13, the rotor 2 is made to rotate stepwise.

The electromagnetic diaphragm device of the invention having such a structure as shown in FIGS. 1 and 2 is incorporated into the lens mounting as shown in FIG. 3, and the lens mounting is attached to the camera body to form an AE (automatic exposure control device-equipped) camera. A control system of such a device is partly illustrated in a block diagram of FIG. 6.

Figure 6:
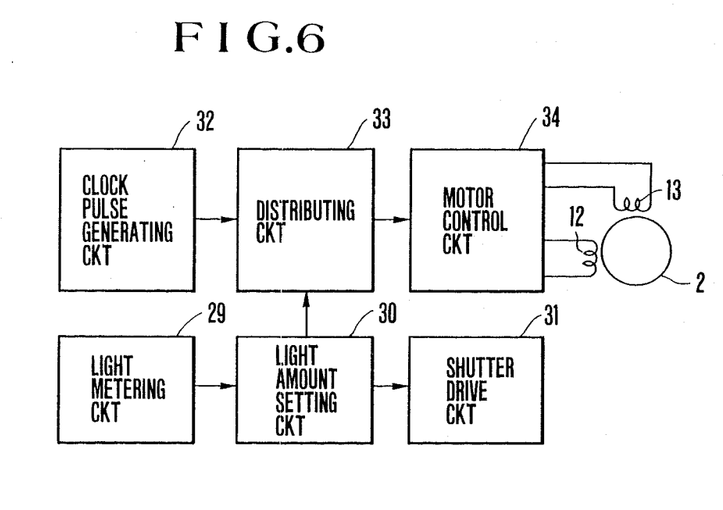
FIG. 6 is a block diagram illustrating part of a control circuit in the camera having the device of the invention incorporated therein.

In FIG. 6, the system includes a light metering circuit 29, a light amount setting circuit 30, a shutter drive circuit 31, a clock pulse generating circuit 32, a distributing circuit 33, and a motor control circuit 34.

Next, the control operation during the taking of a photograph with the aforesaid camera, and the operation of the diaphragm blades 16 will be described by reference to FIGS. 1 and 6.

When a photograph is taken, a release button of the camera is pushed down, thereby the light metering circuit 29 is activated to automatically measure the light. Based on the light value obtained, the light amount setting circuit 30 computes the film sensitivity, the necessary shutter speed, and the necessary aperture value to determine a necessary number of aperture stops. Note that, in the case of this embodiment, the shape of the camming slot 15a and the angle of rotation of the rotary ring 17 are so designed that when the rotor 2 rotates one step, the size of opening of the diaphragm aperture changes ⅛ stop. In other words, the relation of the camming slot 15a and the rotary ring 17 is so determined that when the rotor 2 is rotated 8 steps, the diaphragm is moved one stop.

The number of aperture stops determined by the light amount setting circuit 30 is inputted to the distributing circuit 33. In the distributing circuit 33, clock pulses are divided into prescribed steps. Its output is applied to the motor control circuit 34. In the motor control circuit 34, depending on the input signal, the directions of current flow to the coils 12 and 13, and which coil should be supplied with current are controlled. As a result, the rotor 2 is rotated in a predetermined direction by a predetermined angle. As to the control of the rotation of the rotor 2, an explanation has already been provided so its explanation is omitted here.

For this reason, the ring 17 is rotated through the pinion 4. The diaphragm blades 16 pivotally mounted on the ring 17 while being rotated along with the ring 17 about the axis of the ring 17 are turned about their pivot pins on the ring 17 along the camming slots 15a. When the diaphragm blades 16 are turned about the pins 16b in the clockwise direction as viewed in FIG. 1, the aperture is opened. When the pin 16a has reached the outermost position of the camming slot 15a, the aperture is fully opened. When the diaphragm is at full open aperture, the contact piece 17d carried on the rotary ring 17 disengages from the electrically conductive pattern 14a on the electrically conductive pattern plate 14. This implies that the fact that the diaphragm has reached the full open aperture is electrically detected by the control circuit (not shown).

According to the present invention described above, since the rotor of the motor is reduced in diameter, the inertia can be made smaller. This produces an advantage of improving the control response characteristic. Further, since the coils, the structure of the stators, and the rotor are placed in row, the motor becomes so compact as to snugly fit in a space between the inner and outer diameters of the diaphragm device. Also since its weight is reduced, it becomes possible to incorporate the diaphragm device into the lens mounting without causing the diameter and the total length of the outer barrel of the lens mounting to be increased, or without having to deform the outer barrel with a projection in a portion thereof. And, since it has been made possible to electrically control the opening of the diaphragm aperture, there is a further advantage that the mechanism for driving the diaphragm by the swinging pin from the camera body side as in the prior art is made unnecessary.

Also, since the rotary ring serves as a large speed reduction large gear, the high speed rotation of the rotor can be converted to a slow speed rotation of torque so that the diaphragm device of large diameter for use in the reflex camera can be easily driven.

Further, since the support member supporting the motor is made of that material which does not resonate with the motor, vibrations due to the motor are prevented.

Furthermore, according to the invention, the dead space in the lens mounting is effectively utilized, thereby it is made possible to realize a lens of reduced size.

What is claimed is:

1. A diaphragm control device for an interchangeable lens, comprising:
   (a) a rotary member having a ring-shaped disc form provided with a plurality of diaphragm blades and having an optical path opening in a central portion thereof, said diaphragm blades opening and closing said optical path opening to regulate a diaphragm opening as said rotary member rotates, said rotary member having a driven gear portion formed on an outer periphery thereof; and
   (b) a motor including (i) a rotor having a central axis line extending in parallel with a central axis line of said optical path opening, (ii) stators arranged along said rotor, and (iii) coils for said stators, said motor being arranged on an outside of an exposure aperture in said optical path opening in a state where said blades are in a full open state, a rotor shaft of said rotor being operatively connected to said driven gear portion formed on the outer periphery of said rotary member so that said rotary member rotates by rotation of said rotor, said stators and said coils being disposed in an arcuate row on the outside of said exposure aperture.

2. A device according to claim 1, further comprising a gear fixedly mounted to said rotor shaft and meshing with said driven gear portion for effecting speed reduction.

3. A device according to claim 1 or 2, wherein said rotor, said stators and said coils are arranged in parallel with each other.

4. A device according to claim 2, wherein said driven gear portion for effecting speed reduction is a rack.

5. A diaphragm control device for an interchangeable lens, comprising:
(a) a rotary member of ring-shaped disc form provided with a plurality of diaphragm blades and having an optical path hole in a central portion thereof, said diaphragm blades opening and closing said optical path hole to regulate a diaphragm opening as said rotary member rotates;
(b) a support member of a ring-shaped disc form having a common axis with said rotary member and an optical path opening in superimposition with the optical path hole of said rotary member; and
(c) a motor fixedly mounted on a surface of said ring-shaped disc of said support member, said motor including a rotor, stators, and coils for said stators, said rotor, stators and coils having central axis lines extending in parallel with said common axis said stators being arranged along said rotor, a driven gear portion for speed reduction being provided on an outer periphery of said rotary member, and rotation of said rotor being transmitted to said driven gear portion through gear means provided on a shaft of said rotor.

6. A device according to claim 5, wherein said stators take their place together with said rotor and said coils in an arcuate row on an outside of an exposure aperture in said optical path hole.

7. A device according to claim 5, wherein said support member is made of a constituent material which does not resonate with vibrations of said motor.

8. A device according to claim 5, wherein said rotary member is provided with a first contact, and said support member is provided with a second contact, so that when said rotary member lies in a position where said diaphragm blades are fully open, said first and said second contacts are in a first state, and when said rotary member rotates from said position to move said diaphragm blades from the full open state to close down state, said first and said second contacts move to a second state, so that the full open state of the diaphragm is detected by said contacts.

9. A device according to claim 5, wherein a flexible printed board is arranged in a portion of said surface of said ring-shaped disc of said support member, said printed board is connected to said coil, and an extended end portion of said printed board is connected to a motor control circuit arranged in separation of said motor.

10. A diaphragm control device having a ring-shaped disc form provided with diaphragm blades to open and close an exposure aperture at a central portion thereof, comprising:
(a) a ring-shaped disc portion; and
(b) a motor having a longitudinal projected length and fixedly mounted on a surface of said ring-shaped disc portion between a periphery of said aperture and an outer periphery of said diaphragm control device, said diaphragm blades performing opening and closing operations by rotation of said motor, said motor including a rotor having an axis of rotation approximately parallel with an optical axis of said aperture, a coil and a plurality of stator pole teeth arranged so as to sandwich said rotor and each of said teeth confronts a magnetic pole surface of said rotor, and said rotor and said coil being arranged in an arcuate form along said aperture.

11. An interchangeable lens mounting, comprising:
(a) a zoom mechanism having zoom lens means arranged to be axially movable in a barrel;
(b) a diaphragm device connected to said zoom mechanism and axially movable between a first position and a second position in said barrel as said zoom mechanism moves, said diaphragm device comprising diaphragm blades rotatably mounted on a rotary ring having an aperture in a central portion thereof and a ring-shaped disc having an aperture to regulate an exposure aperture of said diaphragm device by said diaphragm blades;
(c) a motor fixedly mounted on a surface of said ring-shaped disc between a periphery of the exposure aperture of said diaphragm device and an outer periphery of said diaphragm device and arranged so as to longitudinally project from said disc surface, said diaphragm blades being driven by said motor; and
(d) a case portion fixedly mounted in a position substantially diametrically aligned with that of said motor when said diaphragm device has moved to said first position within said barrel and where it confronts said ring-shaped disc surface of said diaphragm device on which said motor is arranged, an electrical circuit for drive control of said motor being arranged in said case portion.

12. A diaphragm device for an interchangeable lens, comprising:
(a) a cam plate having an optical path opening in a central portion thereof;
(b) a rotary plate having an optical path hole in a central portion thereof and being arranged to face said cam plate, said rotary plate having a toothed portion on a part of an outer peripheral surface thereof, said toothed portion being disposed inside of an outermost peripheral surface of said cam plate;
(c) a plurality of diaphragm blades rotatably mounted between said rotary plate and said cam plate and arranged to open or close said optical path opening and said optical path hole when said rotary plate rotates;
(d) a motor located outside of said optical path opening and said optical path hole; and
(e) a gear to be rotated by a rotating force of said motor and engageable with said toothed portion of said rotary plate so as to rotate said rotary plate by the rotating force of said motor.

13. A diaphragm device for an interchangeable lens, comprising:
(a) a cam plate having an optical path opening in a central portion thereof;
(b) a rotary plate having an optical path hole in a central portion thereof and being arranged to face said cam plate, said rotary plate having a toothed portion on a part of an outer peripheral surface thereof;
(c) a plurality of diaphragm blades rotatably mounted between said rotary plate and said cam plate and arranged to open or close said optical path opening and said optical path hole when said rotary plate rotates;

(d) a support member having an optical path aperture in a central portion thereof and arranged to face a reverse side of the face of said rotary plate facing said cam plate, said toothed portion of said rotary plate being located inside of an outer peripheral surface of said support member, (e) a motor located outside of said optical path opening and said optical path aperture; and (f) a gear to be rotated by a rotating force of said motor and engageable with said toothed portion of said rotary plate so as to rotate said rotary plate by the rotating force of said motor.

14. A diaphragm device for an interchangeable lens, comprising:

(a) a cam plate having an optical path opening in a central portion thereof;

(b) a rotary plate having an optical path hole in a central portion thereof and being arranged to face said cam plate, said rotary plate having a toothed portion on a part of an outer peripheral surface thereof;

(c) a plurality of diaphragm blades rotatably mounted between said rotary plate and said cam plate and arranged to open or close said optical path opening and said optical path hole when said rotary plate rotates;

(d) a support member having an optical path aperture in a central portion thereof and arranged to face a reverse side of a surface of said rotary plate facing said cam plate, said support member being provided with a bearing portion; and (e) a motor located outside of said optical path opening and said optical path hole and said optical path aperture, a rotating force of said motor being transmitted to said rotary plate through a gear engageable with said toothed portion of said rotary plate, said gear being provided on a rotating force transmitting shaft supported by said bearing portion of said support member.

15. A device according to claim 14, wherein said toothed portion of said rotary plate is located inside of an outer peripheral surface of said support member.

16. A diaphragm control device for an interchangeable lens, comprising:

(a) a rotary member of ring-shaped disc form provided with a plurality of rotatable diaphragm blades and having an optical path hole in a central portion thereof, said diaphragm blades opening and closing said optical path hole to regulate a diaphragm opening as said rotary member rotates; and (b) a motor having a central axial line extending in parallel with a central axis of said optical path hole, stators arranged along said rotor, and coils for said stators, said motor being arranged on an outside of an exposure aperture in said optical path hole in a state where said blades are in a full open state, wherein said diaphragm blades are driven by a rotating force of said motor and said stators and coils being disposed in an arcuate row on the outside of said exposure aperture.

17. An interchangeable lens mounting, comprising:

(a) a barrel;

(b) a zoom mechanism having zoom lens means arranged to be axially movable in said barrel;

(c) a diaphragm device connected to said zoom mechanism and axially movable between a first position and a second position in said barrel as said zoom mechanism moves, said diaphragm device comprising diaphragm blades rotatably mounted on a rotary ring having an aperture in a central portion thereof and a ring-shaped disc having an aperture to regulate an exposure aperture of said diaphragm device by said diaphragm blades;

(d) a motor fixedly mounted on a surface of said ring-shaped disc and arranged so as to longitudinally project from said disc surface, said diaphragm blades being driven by said motor; and (e) a case portion fixedly mounted in a position substantially diametrically aligned with that of said motor when said diaphragm device has moved to said first position within said barrel and where it confronts said disc surface of said diaphragm device on which said motor is arranged, an electrical circuit being disposed in said case portion.

18. An interchangeable lens device, comprising:

(a) a diaphragm unit including:

(1) a cam plate having an optical path opening in a central portion thereof, (2) a rotary plate having an optical path hole in a central portion thereof and being arranged to face said cam plate, said rotary plate having a toothed portion on a part of an outer peripheral surface thereof, and (3) a plurality of diaphragm blades rotatably mounted between said rotary plate and said cam plate and arranged to open or close said optical path opening and said optical path hole when said rotary plate rotates, wherein the toothed portion of said rotary plate is located inside of the outermost peripheral surface of said diaphragm unit, (b) a motor located outside of said optical path opening and said optical path hole; and (c) a gear to be rotated by a rotating force of said motor and engageable with said toothed portion of said rotary plate so as to rotate said rotary plate by the rotating force of said motor.

* * * * *

UNITED STATES PATENT AND TRADEMARK OFFICE
CERTIFICATE OF CORRECTION

PATENT NO. : 4,874,233

DATED : October 17, 1989

INVENTOR(S) : Hiroshi Yamamoto, et al.

It is certified that error appears in the above-identified patent and that said Letters Patent is hereby corrected as shown below:

On the title page:

[75] Inventors:

"Hiroshi Yamomoto" should read --Hiroshi Yamamoto--.

COLUMN 1:

Line 50, "too" should be deleted.

COLUMN 2:

Line 19, "poor also," should read --poor. Also,--.

COLUMN 3:

Line 3, "be" should read --by--.

COLUMN 4:

Line 25, "and" should be deleted.

Line 40, "alternatively" should read --alternately--.

Line 50, "alternatively" should read --alternately--.

Line 62, "adjust" should read --just--.

UNITED STATES PATENT AND TRADEMARK OFFICE
CERTIFICATE OF CORRECTION

PATENT NO. : 4,874,233
DATED : October 17, 1989
INVENTOR(S) : Hiroshi Yamamoto, et al.

It is certified that error appears in the above-identified patent and that said Letters Patent is hereby corrected as shown below:

COLUMN 6:

Line 16, "projected portion 17b the" should read --projected portion 17b and the--.

Line 42, "intergrated" should read --integrated--.

Line 60, "elements mounting" should read --elements of the lens mounting--.

Line 67, "second stroke position $Z_2$" should read --second stroke end position $Z_2$--.

COLUMN 8:

Line 25, "$\theta = no + p/2$" should read --$\theta = np + p/2$--.

COLUMN 9:

Line 46, "5/8 stop." should read --1/8 stop.---.

COLUMN 10:

Line 31, "large" should be deleted.

Line 33, "torque" should read --large torque--.

UNITED STATES PATENT AND TRADEMARK OFFICE
CERTIFICATE OF CORRECTION

PATENT NO. : 4,874,233   Page 3 of 3
DATED : October 17, 1989
INVENTOR(S) : Hiroshi Yamamoto, et al.

It is certified that error appears in the above-identified patent and that said Letters Patent is hereby corrected as shown below:

COLUMN 11:

Line 25, "axis" should read --axis,--.

COLUMN 13:

Line 8, "member," should read --member;--.

Line 53, "motor having" should read --motor including a rotor having--.

Signed and Sealed this

Twenty-sixth Day of March, 1991

Attest:

HARRY F. MANBECK, JR.

Attesting Officer    Commissioner of Patents and Trademarks